Sept. 28, 1937.

I. S. MINCKS 2,094,406

COOKING DEVICE

Filed July 1, 1936

Isaiah S. Mincks
INVENTOR

Philip W. F. Terrell
BY
ATTORNEY

Patented Sept. 28, 1937

2,094,406

UNITED STATES PATENT OFFICE 2,094,406

COOKING DEVICE

Isaiah S. Mincks, Tulsa, Okla.

Application July 1, 1936, Serial No. 88,449

3 Claims. (Cl. 53—5)

The invention relates to a cooking device and particularly to a cooking utensil constructed in a manner whereby an article of food may be placed therein and subjected to a cooking operation over its entire surface thereby sealing the flavors in the food and preventing escape of the flavors during the cooking operation.

A further object is to provide a cooking utensil particularly adapted for cooking meat and constructed in a manner whereby meat may be placed therein and immediately seared over its entire surface, thereby sealing in the juices and flavor during the further cooking operation.

A further object is to form the device from a body member having a chamber extending entirely through the same for the reception of the article of food and to place the open ends thereof in engagement with hot plate closures for forming a closed receptacle engaging all sides of the article of food. Also to form said chambered member and hot plate members from relatively thick metallic material which may be preheated and will retain the heat for immediately searing the article when the device is assembled.

A further object is to provide a method of cooking an article of food comprising simultaneously searing all surfaces of the article of food with pre-heated searing elements entirely housing the article of food.

A further object is to encompass the body engaging portion of the article of food with an edible material having lubricating properties, for instance as bacon strips, for preventing the cooked article from sticking in the chamber of the body member.

A further object is to provide means for preventing the sticking of the cooked article of food within the chamber of the body member and formed from an edible material having lubricating properties.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

Figure 1:
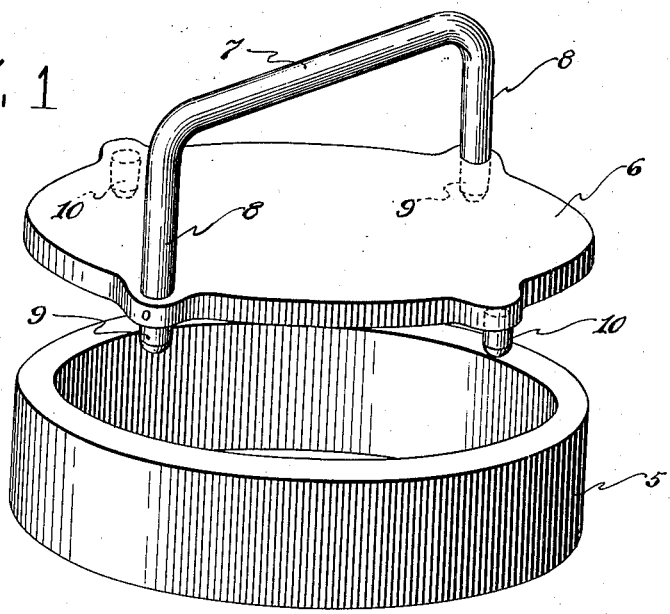
Figure 1 is a perspective view of the ring and cover plate, showing the cover plate in position to be placed on the ring.

Referring to the drawing the numeral 1 designates a conventional form of hot plate which may be heated in any suitable manner, however for purposes of illustration a conventional form of burner 2 is shown. The hot plate it will be noted, is of the same thickness as the materials forming the other parts of the device to retain heat and transmit the same to the article of food 3, which may be steak, for which the device is particularly adapted.

Figure 2:
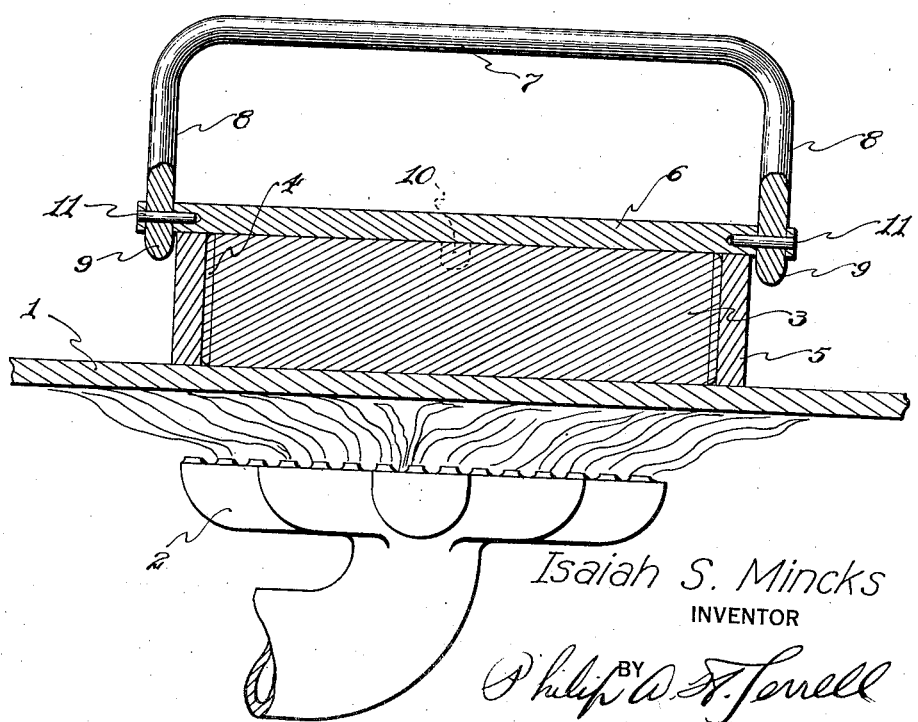
Figure 2 is a vertical longitudinal sectional view through a conventional form of hot plate and through the cooking device showing an article of food therein.

The piece of steak 3 is first provided with an outer covering formed from an edible material having lubricating properties, for instance bacon. After the strips of bacon are placed around the steak, the steak is placed within the annular body 5 of the cooking utensil. The body 5 has its upper and lower ends open as clearly shown in Figure 2 and is preheated the same as the hot plate 1. It will be noted that the hot plate 1 forms the bottom closure for the body, and in combination with the body engages all of the side walls of the steak 3 as well as the bottom. The operation of putting the steak within the body 5 is a quick one after which the preheated cover plate 6 is placed on the upper side of the body 5 and the steak 3 and in combination with the body 5 and hot plate 1 sears the entire surface of the steak, thereby sealing in all the juices and flavor. The cooking operation continues as long as desired.

The cover plate 6, as well as the body 5 and hot plate 1 are relatively thick so that they will retain the heat for a considerable length of time when pre-heated, however it will be noted that under the continued cooking operation the heat is supplied by the burner 2.

The cover plate 6 is provided with a U-shaped handle, the arms 8 of which extend downwardly and terminate below the lower surface of the cover plate and in rounded ends 9, which form centering means when the cover plate is placed in position and prevents, in combination with the downwardly extending lugs 10, the lateral displacement of the cover plate during the cooking operation. This is particularly advantageous when many of the devices are placed on a large hot plate, for instance when the device is used in a restaurant. Arms 8 are anchored to the opposite sides of the cover plate 6 by means of pins 11.

From the above it will be seen that a cooking utensil is provided which is particularly adapted for cooking steaks and constructed in a manner whereby when the parts are heated they will engage the entire surface of the steak and simultaneously sear all of said surfaces, thereby sealing in all of the juices and flavors at the initial stage of the cooking operation. It will also be seen by providing the bacon strips 4, the steak, after the cooking operation, may be easily removed from the body 1 as the lubricating properties of the bacon strips will furnish sufficient grease to prevent sticking.

The invention having been set forth what is claimed as new and useful is:

1. A broiler comprising a body member having a chamber extending entirely through the same and adapted to be closed at one end when placed on a heating element, said body member being relatively thick whereby it will store heat units when preheated and a relatively thick cover plate closing the upper end of the body member and adapted to store heat units when preheated and to engage directly an article of food entirely filling the chamber of the body member.

2. A device as set forth in claim 1 including a handle member carried by the cover plate and arching the same, said handle member having extensions extending through the cover plate and overlying the sides of the body member.

3. A device as set forth in claim 1 wherein the body member and cover are of sufficient weight whereby they will entirely engage the upper side of an article of food and all of the sides thereof during a cooking operation.

ISAIAH S. MINCKS.